(12) United States Patent
Uchida et al.

(10) Patent No.: US 11,074,610 B2
(45) Date of Patent: Jul. 27, 2021

(54) SALES PROMOTION SYSTEM, SALES PROMOTION METHOD, NON-TRANSITORY COMPUTER READABLE MEDIUM, AND SHELF SYSTEM

(71) Applicant: NEC Corporation, Tokyo (JP)

(72) Inventors: Kaoru Uchida, Tokyo (JP); Nobuyuki Yamashita, Tokyo (JP)

(*) Notice: Subject to any disclaimer, the term of this patent is extended or adjusted under 35 U.S.C. 154(b) by 0 days.

(21) Appl. No.: 16/126,004

(22) Filed: Sep. 10, 2018

(65) Prior Publication Data

US 2019/0005537 A1    Jan. 3, 2019

Related U.S. Application Data

(63) Continuation of application No. 14/916,723, filed as application No. PCT/JP2014/004582 on Sep. 5, 2014, now abandoned.

(30) Foreign Application Priority Data

Sep. 6, 2013    (JP) ................... 2013-185129

(51) Int. Cl.
*G06Q 30/00*    (2012.01)
*G06Q 30/02*    (2012.01)
(Continued)

(52) U.S. Cl.
CPC ......... *G06Q 30/0246* (2013.01); *G06F 3/013* (2013.01); *G06K 9/00228* (2013.01);
(Continued)

(58) Field of Classification Search
CPC ........... G06Q 30/0246; G06Q 30/0255; G06Q 30/0261; G06F 3/013; G06K 9/00228; G06K 9/00288; G06K 9/00771
(Continued)

(56) References Cited

U.S. PATENT DOCUMENTS 6,587,835 B1* 7/2003 Treyz .................. G06Q 20/12
705/14.64
8,984,622 B1    3/2015 Baldwin et al.
(Continued)

FOREIGN PATENT DOCUMENTS

CN    102150176 A    8/2011
JP    11-175730    7/1999
(Continued)

OTHER PUBLICATIONS

Hackenberg, Georg, et al. Lightweight Palm and Finger Tracking for Real-Time 3D Gesture Control, IEEE Virtual Reality 2011, Mar. 23, 2011, downloaded from https://ieeexplore.ieee.org/stamp/stamp.jsp?tp=&arnumber=5759431 on Mar. 13, 2021 (Year: 2011).*
(Continued)

*Primary Examiner* — Scott D Gartland (57) ABSTRACT

A sales promotion system (10) includes an image information acquisition unit (11) that acquires input image information on an image taken of a presentation area where a product is presented to a customer, a tracking unit (12) that tracks an action of the customer regarding the product based on the input image information, and a promotion information output unit (13) that outputs promotion information related to the product corresponding to the tracked customer's action to the customer. This enables more effective promotions.

11 Claims, 9 Drawing Sheets

(51) Int. Cl.
*G06F 3/01* (2006.01)
*G06K 9/00* (2006.01)

(52) U.S. Cl.
CPC ..... *G06Q 30/0261* (2013.01); *G06K 9/00288* (2013.01); *G06K 9/00771* (2013.01)

(58) Field of Classification Search
USPC .............................. 705/14.45, 14.53, 14.58
See application file for complete search history.

(56) References Cited

U.S. PATENT DOCUMENTS

| | | | | |
|---|---|---|---|---|
| 9,298,267 | B2* | 3/2016 | Lim | G06K 9/00355 |
| 2002/0062245 | A1* | 5/2002 | Niu | G06Q 30/02 |
| | | | | 705/14.51 |
| 2002/0082931 | A1* | 6/2002 | Siegel | G06Q 30/0625 |
| | | | | 705/26.62 |
| 2004/0111454 | A1* | 6/2004 | Sorensen | G06Q 30/02 |
| | | | | 708/200 |
| 2005/0012613 | A1* | 1/2005 | Eckstein | G06K 7/0008 |
| | | | | 340/539.13 |
| 2005/0039206 | A1* | 2/2005 | Opdycke | G06Q 30/0277 |
| | | | | 725/35 |
| 2007/0073589 | A1 | 3/2007 | Vergeyle et al. | |
| 2007/0294207 | A1 | 12/2007 | Brown | |
| 2008/0215427 | A1* | 9/2008 | Kawada | G06Q 30/02 |
| | | | | 705/14.51 |
| 2008/0249859 | A1 | 10/2008 | Angell et al. | |
| 2008/0319835 | A1 | 12/2008 | Tsuji | |
| 2009/0055204 | A1* | 2/2009 | Pennington | G07F 17/3239 |
| | | | | 463/29 |
| 2009/0083121 | A1 | 3/2009 | Angell | |
| 2009/0103780 | A1* | 4/2009 | Nishihara | G06F 3/017 |
| | | | | 382/103 |
| 2009/0204370 | A1 | 8/2009 | Chu et al. | |
| 2009/0306893 | A1 | 12/2009 | Lilley | |
| 2011/0112890 | A1 | 5/2011 | Chu et al. | |
| 2012/0123674 | A1 | 5/2012 | Perks et al. | |
| 2013/0054310 | A1* | 2/2013 | Sickenius | G06Q 30/02 |
| | | | | 705/7.39 |
| 2013/0117053 | A2* | 5/2013 | Campbell | G06Q 10/087 |
| | | | | 705/7.11 |
| 2014/0289009 | A1* | 9/2014 | Campbell | G06Q 30/0202 |
| | | | | 705/7.31 |
| 2014/0365272 | A1 | 12/2014 | Hurewitz | |

FOREIGN PATENT DOCUMENTS

| | | |
|---|---|---|
| JP | 2003-256705 | 9/2003 |
| JP | 2006-184387 | 7/2006 |
| JP | 2007-109058 | 4/2007 |
| JP | 2009-3701 | 1/2009 |
| JP | 2009-48430 | 3/2009 |
| JP | 2009-187554 | 8/2009 |
| JP | 2009-199517 | 9/2009 |
| JP | 2011-150425 | 8/2011 |
| JP | 2012-38035 | 2/2012 |
| JP | 2013-54539 | 3/2013 |
| WO | WO 2010/004719 A1 | 1/2010 |

OTHER PUBLICATIONS

H. Niisato, 'Android Engineer kara no Shotaijo' Dai 29 Kai Android de Hajimeru NUI Application, Software Design, No. 263, p. 139, left column, lines 21 to 24, Sep. 2012.

K. Okawara, Zukai Big Data Hayawakari, 1$^{st}$ Edition, Kabushiki Kaisha Chukei Shuppan, pp. 20-22, Jan. 2013.

T. Yokoyama et al., Big Data Jidai no Shin Marketing Shiko, 1$^{st}$ Edition, Softbank Creative Corp., p. 35, Nov. 2012.

International Search Report and Written Opinion dated Dec. 16, 2014 in corresponding PCT International Application.

Decision to Grant a Patent dated Nov. 21, 2017, by Japanese Patent Office in counterpart Japanese Patent Application No. 2015-535320.

Notification of First Office Action dated Mar. 18, 2019, issued by the China National Intellectual Property Administration (Chinese Patent Office) in counterpart Chinese Patent Application No. 201480048604.1.

Cornelia Pechmann et al., "The Effects of Comparative Advertising on Attention, Memory, and Purchase Intentions", Journal of Consumer Research, Oxford University Press, vol. 17, No. 21, Sep. 1990, pp. 180-191.

U.S. Office Action dated Feb. 21, 2020, issued in counterpart U.S. Appl. No. 16/125,971.

Office Action dated Mar. 17, 2020, issued in co-pending U.S. Appl. No. 16/125,893.

Office Action issued by the United States Patent and Trademark Office in corresponding U.S. Appl. No. 16/125,893, dated Sep. 22, 2020.

Office Action issued by the United States Patent and Trademark Office in corresponding U.S. Appl. No. 16/125,971, dated Oct. 13, 2020.

Tischler; "Kraft Store Kiosk Scans Your Face Then Knows What to Feed It", dated Jan. 14, 2011, downloaded Oct. 7, 2020 from https://www.fastcompany.com/1716684/kraft-store-kiosk-scans-your-face-then-knows-what-feed-it-video pp. 1-7 (Jan. 14, 2011).

U.S. Office Action for U.S. Appl. No. 16/125,971 dated May 4, 2021.

Miles, Stephanie, "6 Indoor Navigation Platforms for Retailers", StreetFight, Jan. 29, 2013, Archive.org available by Feb. 6, 2013 and downloaded from https://web.archive.org/web/20130206235656/hllps://streeelfightmag.com/2013/01/29/6-indoor-navigation-platforms-for-retailers/ on Apr. 29, 2021. (Year 2013).

Aisle411 is an easier way to shop, author unknown, from the aisle411 website, downloaded via Archive.org from https://web.archive.org/web/20110225133807/http://aisle411.com/how-it-works/ on Apr. 29, 2021 and dated Feb. 25, 2011 (Year: 2011).

U.S. Office Action for U.S. Appl. No. 16/125,893 dated May 17, 2021.

S. Kwon et al., "Validation of heart rate extraction using video imaging on a built-in camera system of a smartphone", 2012 Annual International Conference of the IEEE Engineering in Medicine and Biology Society, San Diego, California USA, Aug. 28-Sep. 1, 2012, pp. 2174-2177.

\* cited by examiner

SALES PROMOTION SYSTEM, SALES PROMOTION METHOD, NON-TRANSITORY COMPUTER READABLE MEDIUM, AND SHELF SYSTEM

CROSS-REFERENCE TO RELATED PATENT APPLICATIONS

This application is a continuation of U.S. patent application Ser. No. 14/916,723 filed Mar. 4, 2016, which is a National Stage Entry of International Application No. PCT/JP2014/004582, filed Sep. 5, 2014, which claims priority from Japanese Patent Application No. 2013-185129, filed Sep. 6, 2013. The entire contents of the above-referenced applications are expressly incorporated herein by reference.

TECHNICAL FIELD

The present invention relates to a sales promotion system, a sales promotion method, a non-transitory computer readable medium storing a sales promotion program, and a shelf system and, particularly, to a sales promotion system, a sales promotion method, a non-transitory computer readable medium storing a sales promotion program, and a shelf system using product and customer images.

BACKGROUND ART

A variety of sales promotions are carried out in stores and the like where many products are displayed. For example, information on products is provided to customers through pamphlets and the like placed in stores, or salesclerks offer customers a discount based on their reactions to the products.

Patent Literatures 1 to 5, for example, are known as related art.

CITATION LIST

Patent Literature

PTL1: Japanese Unexamined Patent Publication No. 2013-054539
PTL2: Japanese Unexamined Patent Publication No. 2012-038035
PTL3: Japanese Unexamined Patent Publication No. 2009-048430
PTL4: Japanese Unexamined Patent Publication No. 2009-003701
PTL5: Japanese Unexamined Patent Publication No. 2006-184387

SUMMARY OF INVENTION

Technical Problem

For example, according to the techniques disclosed in related art like Patent Literature 1, when a customer's face or hand comes close to an infrared sensor of an electronic shelf label terminal, the display content on a display screen of the electronic shelf label terminal is changed.

However, because the technique of the related art simply detects the approach of a customer by an infrared sensor or the like, it is not possible to detect the fact that the customer has taken an interest in a product. Therefore, provision of information is often done by simply placing stationary posters, pamphlets, samples and the like. Further, in the technique of the related art, a timely promotion cannot be carried out at the moment when a customer is thinking about whether to buy a product, and it is not possible to provide information or offer a discount in accordance with the customer's action regarding the product as salesclerks do in stores.

Thus, the technique disclosed in the related art has a problem that it is difficult to carry out effective promotions in accordance with a customer's action regarding a product.

In light of the above, an exemplary object of the present invention is to provide a sales promotion system, a sales promotion method, a non-transitory computer readable medium storing a sales promotion program, and a shelf system capable of carrying out more effective promotions.

Solution to Problem

A sales promotion system according to an exemplary aspect of the present invention includes an image information acquisition means for acquiring input image information on an image taken of a presentation area where a product is presented to a customer, a tracking means for tracking an action of the customer regarding the product based on the input image information, and a promotion information output means for outputting promotion information related to the product corresponding to the tracked customer's action to the customer.

A sales promotion method according to an exemplary aspect of the present invention includes acquiring input image information on an image taken of a presentation area where a product is presented to a customer, tracking an action of the customer regarding the product based on the input image information, and outputting promotion information related to the product corresponding to the tracked customer's action to the customer.

A non-transitory computer readable medium storing a sales promotion program according to an exemplary aspect of the present invention causes a computer to perform a sales promotion process including acquiring input image information on an image taken of a presentation area where a product is presented to a customer, tracking an action of the customer regarding the product based on the input image information, and outputting promotion information related to the product corresponding to the tracked customer's action to the customer.

A shelf system according to an exemplary aspect of the present invention includes a shelf placed to present a product to a customer, an image information acquisition means for acquiring input image information on an image of the product and the customer taken, a tracking means for tracking an action of the customer regarding the product based on the input image information, and a promotion information output means for outputting promotion information related to the product corresponding to the tracked customer's action to the customer.

Advantageous Effects of Invention

According to the exemplary aspects of the present invention, it is possible to provide a sales promotion system, a sales promotion method, a non-transitory computer readable medium storing a sales promotion program, and a shelf system capable of carrying out more effective promotions.

DESCRIPTION OF EMBODIMENTS

Overview of Exemplary Embodiments

Figure 1:
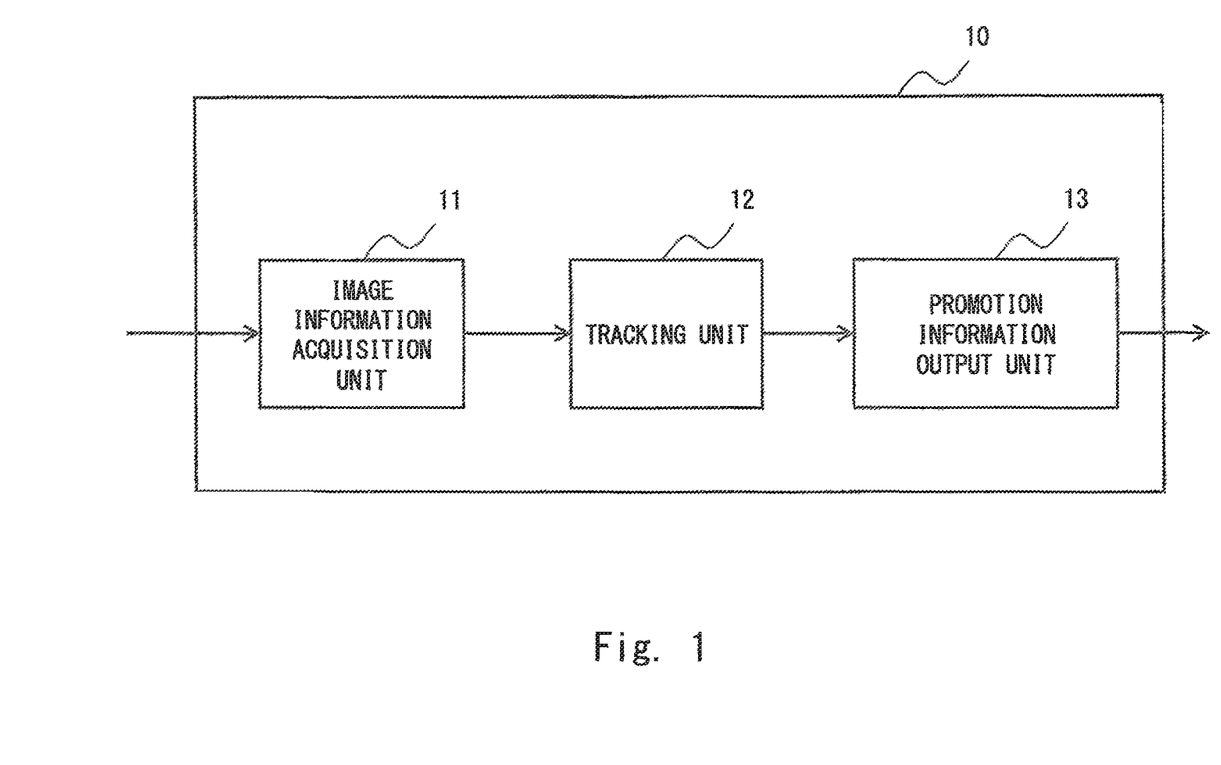
FIG. 1 is a block diagram showing main elements of a sales promotion system according to an exemplary embodiment.

Prior to describing exemplary embodiments, an overview of the characteristics of exemplary embodiments is given hereinbelow. FIG. 1 shows main elements of a sales promotion system according to an exemplary embodiment.

As shown in FIG. 1, a sales promotion system 10 according to this exemplary embodiment includes an image information acquisition unit 11, a tracking unit 12, and a promotion information output unit 13. The image information acquisition unit 11 acquires input image information, which is an image taken of a presentation area where a product is to be presented to customers. The tracking unit 12 tracks a customer's action regarding a product based on the acquired input image information. The promotion information output unit 13 outputs promotion information related to a product corresponding to the tracked customer's action regarding the product.

As described above, in the exemplary embodiment, a customer's action regarding a product is tracked, and promotion information is output to the customer based on the tracked customer's action regarding the product. For example, by tracking the hand, the line of sight and the like of a customer as a customer's action, it is possible to detect the fact that the customer has become interested in the product or the like, which enables effective promotions in accordance with the customer's interests.

First Exemplary Embodiment

Figure 2:
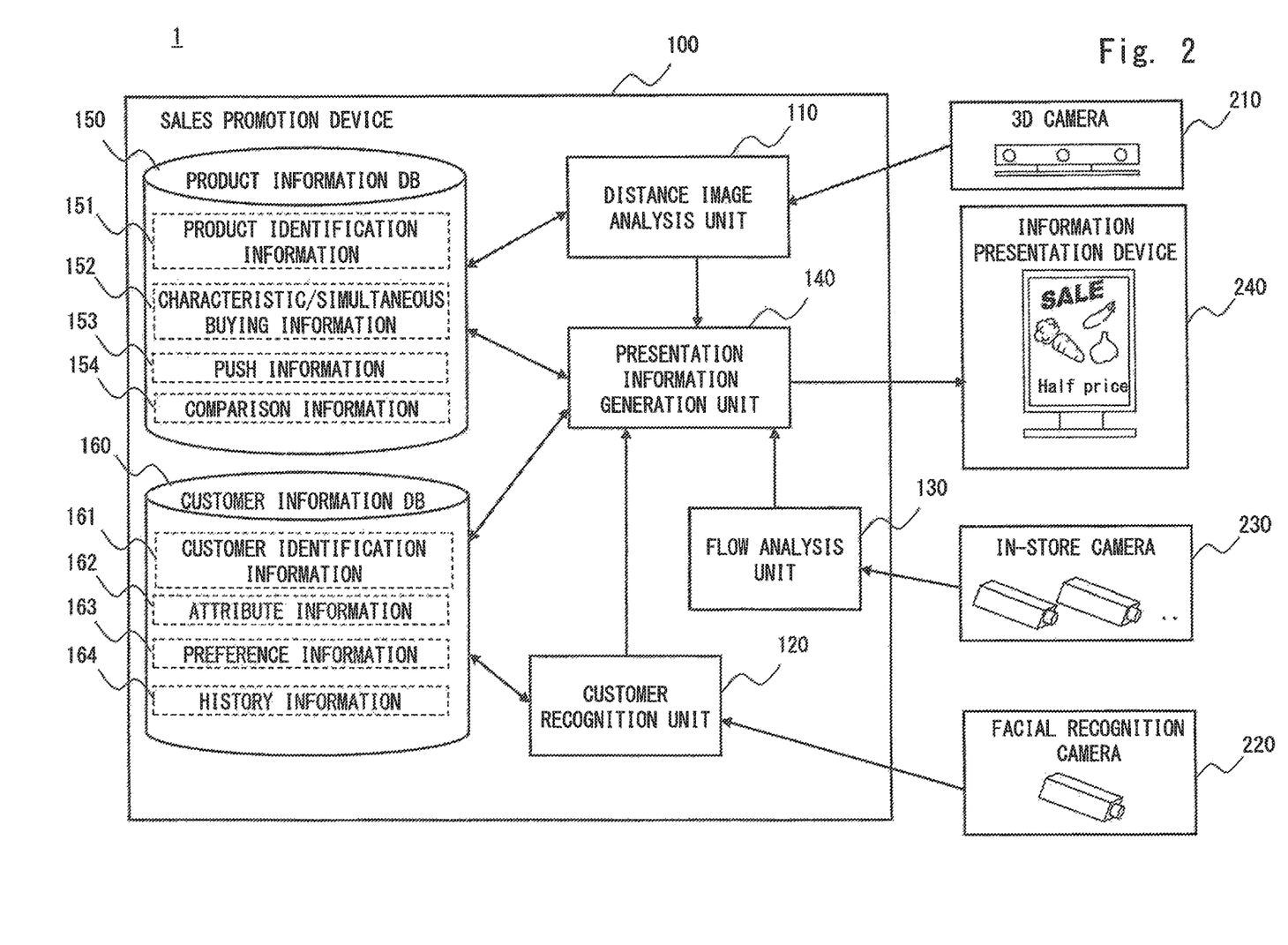
FIG. 2 is a block diagram showing the configuration of a sales promotion system according to a first exemplary embodiment.

A first exemplary embodiment is described hereinafter with reference to the drawings. FIG. 2 is a block diagram showing the configuration of a sales promotion system according to this exemplary embodiment. This sales promotion system is a system that detects a customer's action regarding a product and carries out appropriate promotions in accordance with the detected action in a store or the like. Note that customers include, for example, a person (shopper) who has not yet actually purchased a product (has not yet determined to purchase a product) and a person who just happens to come to (enter) a store.

As shown in FIG. 2, a sales promotion system 1 according to this exemplary embodiment includes a sales promotion device 100, a 3D camera 210, a facial recognition camera 220, an in-store camera 230, and an information presentation device 240. For example, while the respective components of the sales promotion system 1 are placed in the same store, the sales promotion device 100 may be placed outside the store. Although it is assumed in the following description that the respective components of the sales promotion system 1 are separate devices, the respective components may be one or any number of devices.

The 3D (three-dimensional) camera 210 is an imaging device (distance image sensor) that takes an image of and measures a target and generates a distance image (distance image information). The distance image (range image) contains image information which is an image of a target taken and distance information which is a distance to a target measured. For example, the 3D camera 210 is Microsoft Kinect (registered trademark) or a stereo camera. By using the 3D camera, it is possible to recognize (track) a target (a customer's action or the like) including the distance information, and it is thus possible to perform highly accurate recognition.

Figure 3A:
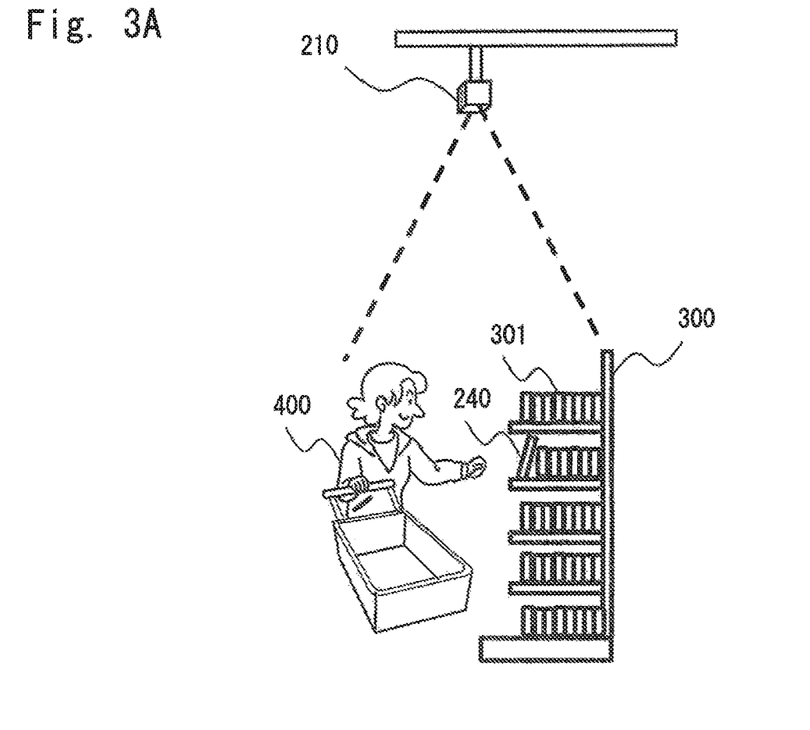
FIG. 3A is a diagram showing a configuration example of a 3D camera and an information presentation device according to the first exemplary embodiment.
Figure 3B:
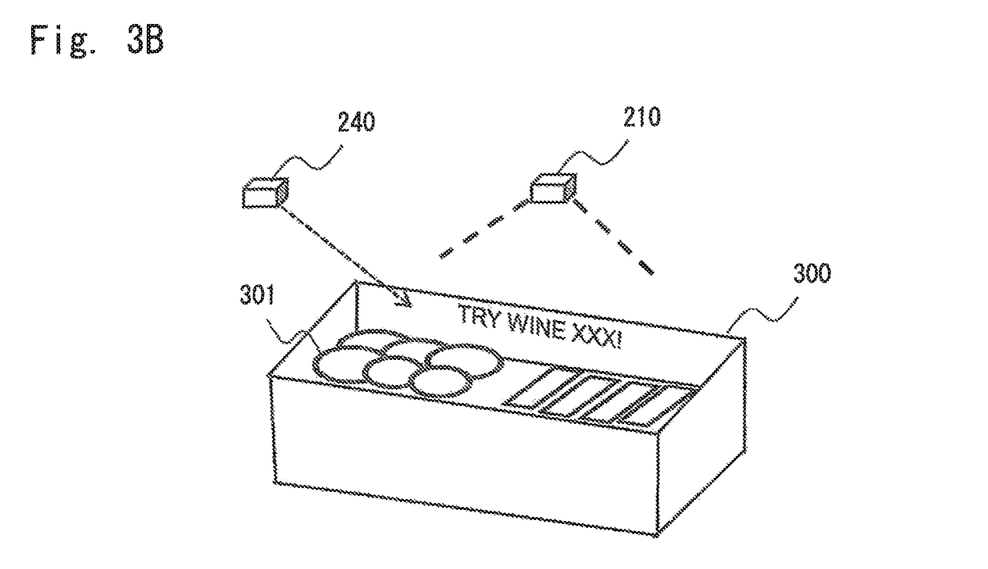
FIG. 3B is a diagram showing a configuration example of a 3D camera and an information presentation device according to the first exemplary embodiment.

As shown in FIGS. 3A and 3B, in order to detect a customer's action regarding a product, the 3D camera 210 takes an image of a product shelf (product display shelf) 300 on which a product 301 is placed (displayed) and further takes an image of a customer 400 who is thinking about purchasing the product 301 in front of the product shelf 300 in this exemplary embodiment. The 3D camera 210 takes an image of a product placement area of the product shelf 300 and an area where a customer picks up/looks at a product in front of the product shelf 300, which is a presentation area where a product is presented to a customer in the product shelf 300. The 3D camera 210 is placed at a position where images of the product shelf 300 and the customer 400 in front of the product shelf 300 can be taken, which is, for example, above (the ceiling etc.) or in front (a wall etc.) of the product shelf 300, or in the product shelf 300. Although the product 300 is a real product (commodity, article, item, goods), for example, it is not limited to being a real thing and may instead be a sample or a print on which a label or the like is printed.

Note that, although an example in which the 3D camera 210 is used as a device that takes images of the product shelf 300 and the customer 400 is described below, it is not limited to the 3D camera and may instead be a general camera (2D camera) that outputs only images taken. In this case, tracking is performed using the image information only.

Each of the facial recognition camera 220 and the in-store camera 230 is an imaging device (2D camera) that takes and generates an image of a target. The facial recognition camera 220 is placed at the entrance of a store or the like, takes an image of a face of a customer who comes to the store and generates a facial image to recognize the customer's face. The in-store camera 230 is placed at a plurality of positions in a store, takes an image of each section in the store and generates an in-store image to detect the customer traffic flow in the store. Note that each of the facial recognition camera 220 and the in-store camera 230 may be a 3D camera. By using a 3D camera, it is possible to accurately recognize the customer's face or the customer's moving route.

The information presentation device 240 is a device that presents (outputs) the promotion information generated by the sales promotion device 100 to a customer. The way of presentation (output) to a customer is not limited, and it may be a display of letters and images on a display device, audio output through a speaker or the like. The sales promotion device 100 is placed at a position where the customer 400 can view (hear) it.

As shown in FIG. 3A, the information presentation device 240 may be a tablet terminal or an electronic paper (stationary POP device etc.), and it may be is placed on a shelf. Further, as shown in FIG. 3B, the information presentation device 240 may be a projector, and it may be placed near a shelf so as to display information on the shelf. In order to effectively present information to customers, it is preferred to place the device (display the information) in a place which is easily viewable by customers, such as on the light of sight of customers or next to a product. Further, it may be placed in a shopping cart or a shopping basket to be used by customers.

As shown in FIG. 2, the sales promotion device 100 includes a distance image analysis unit 111, a customer recognition unit 120, a flow analysis unit 130, a presentation information generation unit 140, a product information DB (database) 150, and a customer information DB 160. Note that, although these blocks are described as the functions of the sales promotion device 100 in this example, another configuration may be used as long as the operation according to this exemplary embodiment, which is described later, can be achieved.

Each element in the sales promotion device 100 may be formed by hardware or software or both of them, and may be formed by one hardware or software or a plurality of hardware or software. For example, the product information DB 150 and the customer information DB 160 may be storage devices connected to an external network (cloud). Each function (each processing) of the sales promotion device 100 may be implemented by a computer including CPU, memory and the like. For example, a sales promotion program for performing a sales promotion method (sales promotion process) according to the exemplary embodiments may be stored in a storage device, and each function may be implemented by executing the sales promotion program stored in the storage device on the CPU.

This sales promotion program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The distance image analysis unit 110 acquires a distance image generated by the 3D camera 210, tracks a detection target based on the acquired distance image, and recognizes its action. In this exemplary embodiment, the distance image analysis unit 110 mainly tracks and recognizes a customer's hand, a customer's line of sight, and a product picked up by a customer. The distance image analysis unit 110 refers to the product information DB 150 to recognize a product contained in the distance image. Note that, although the distance image analysis unit 110 detects a customer's action in this example, it may detect a customer's facial expression (pleasure, surprise etc.), heart rate and the like based on the distance image and present the promotion information in accordance with the facial expression or heart rate. Further, a microphone may be mounted on a 3D camera, and a customer's voice input to the microphone may be recognized by a voice recognition unit. For example, based on the recognized voice, the feature (the loudness, pitch, tempo etc. of a voice) of a customer's conversation may be detected, and the promotion information may be presented in accordance with the feature of the conversation.

The customer recognition unit 120 acquires a facial image of a customer generated by the facial recognition camera 220 and recognizes a customer contained in the acquired facial image by referring to the customer information DB 160. The flow analysis unit 130 acquires an in-store image generated by the in-store camera 230, analyzes the moving history of a customer in the store based on the acquired in-store image and detects the traffic flow (moving route) of the customer.

The presentation information generation unit 140 generates promotion information to be presented to a customer based on detection results of the distance image analysis unit 110, the customer recognition unit 120 and the flow analysis unit 130, and outputs the generated promotion information to the information presentation device 240. The promotion information is information for promoting the sales (purchase) of a product, and it is information that encourages a customer to determine to purchase a product. The presentation information generation unit 140 refers to the product information DB 150 and the customer information DB 160, and generates, as the promotion information, information related to the product which the distance image analysis unit 110 detects has been touched by the customer, information on a product related to the customer recognized by the customer recognition unit 120, and information on a product related to the customer traffic flow analyzed by the flow analysis unit 130.

Note that, although an example where the promotion information in accordance with an action is generated and output to (displayed on) the information presentation device is described in this exemplary embodiment, the generated promotion information may be output to another device or system for further use of the promotion information. For example, the promotion information may be stored as a customer's wish list in the customer information DB or another database, and the promotion information may be provided to the customer through a network.

The product information DB (product information storage unit) 150 stores product related information that is related to products placed in a store. The product information DB 150 stores, as the product related information, product identification information 151, characteristic/simultaneous buying (simultaneous selling) information 152, push information 153, comparison information 154 and the like.

The product identification information 151 is information for identifying a product (product master), and it includes a product code, a product name, a product type, product label image information (image) and the like. The characteristic/simultaneous buying information 152 is characteristic information indicating the characteristics of a product and information (recommendation information, suggestion information) for suggesting to a customer the simultaneous buying of another product with the product, and it includes a product's material or place of origin, food to be eaten in combination with the product, a recipe that uses the product as ingredients, a coordinated product and the like.

The push information 153 is information for encouraging a customer to determine to purchase a product, and it includes, for example, discount information such as a discount coupon. The comparison information 154 is information indicating a comparison of the product with another product, and it includes information about a comparison of the product's, for example, characteristics, price and the like with those of the other product.

The customer information DB (customer information storage unit) 160 stores customer related information that is related to customers who come to a store. The customer information DB 160 stores, as the customer related information, customer identification information 161, attribute information 162, preference information 163, history information 164 and the like.

The customer identification information 161 is information for identifying a customer, and it includes a customer's membership ID, name, address, birth date, facial image information (image) and the like. The attribute information 162 is information indicating the attributes of a customer, and it includes for example, the age, gender, occupation and the like of the customer.

The preference information 163 is information indicating the preferences of a customer, and it includes, for example, a hobby, favorite food, color, music, movie and the like of the customer. The history information 164 is information about the history of a customer, and it includes, for example, a product purchase history, a store visit history, an in-store moving history, a contact history (access history) such as picking up/looking at a product and the like.

Figure 4:
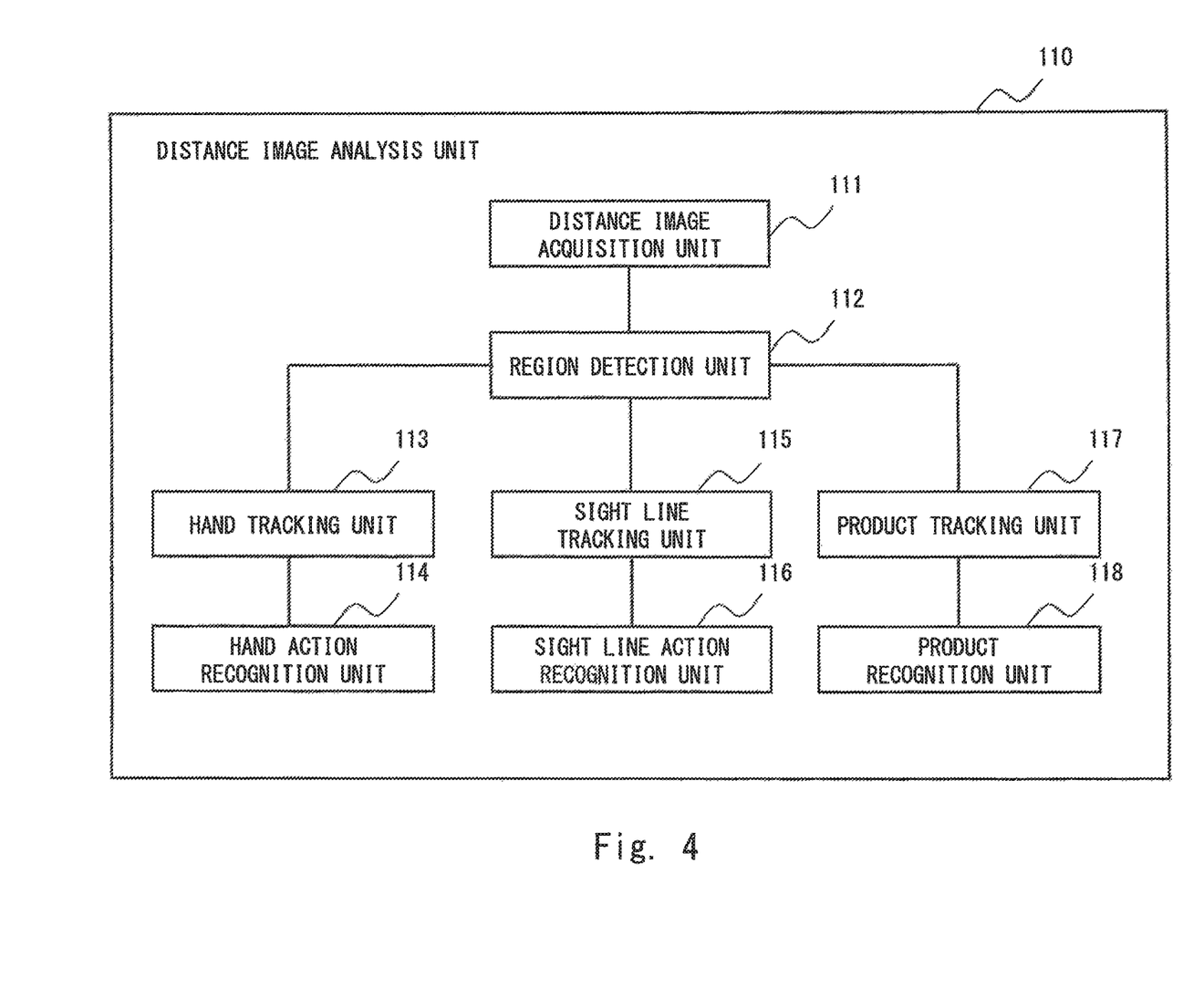
FIG. 4 is a diagram showing a configuration of a distance image analysis unit according to the first exemplary embodiment.

FIG. 4 shows the configuration of the distance image analysis unit 110 in the sales promotion device 100. As shown in FIG. 4, the distance image analysis unit 110 includes a distance image acquisition unit 111, a region detection unit 112, a hand tracking unit 113, a hand action recognition unit 114, a sight line tracking unit 115, a sight line action recognition unit 116, a product tracking unit 117, and a product recognition unit 118.

The distance image acquisition unit 111 acquires a distance image containing a customer and a product which is taken and generated by the 3D camera 210. The region detection unit 112 detects a region of each part of a customer or a region of a product contained in the distance image acquired by the distance image acquisition unit 111.

The hand tracking unit 113 tracks the action of a customer's hand detected by the region detection unit 112. The hand action recognition unit 114 recognizes the customer's action regarding a product based on the hand action tracked by the hand tracking unit 113. For example, when a customer brings the palm of his/her hand toward his/her face while holding the product, the hand action recognition unit 114 determines that the customer has picked up and looked at the product. In the case where, when a product is held in the customer's hand, the hand is hidden behind the product and an thus image of it is not taken by the camera, the hand action recognition unit 114 may detect the position, direction or change of the product being held and thereby determine that the customer has picked up the product.

The sight line tracking unit 115 tracks the action of the customer's line of sight (eye) detected by the region detection unit 112. The sight line action recognition unit 116 recognizes the customer's action regarding a product based on the action of the customer's line of sight (eye) detected by the sight line tracking unit 115. When a product is placed in the direction of the line of sight, the sight line action recognition unit 116 determines that the customer has looked at the product.

The product tracking unit 117 tracks the action (state) of a product detected by the region detection unit 112. The product tracking unit 117 tracks the product which the hand action recognition unit 114 has determined that the customer has picked up or the product which the sight line action recognition unit 116 has determined that the customer has looked at. The product recognition unit 118 identifies which product corresponds to the product tracked by the product tracking unit 117 by referring to the product information DB 150. The product recognition unit 118 compares the label of the detected product with the image information of the label of the product identification information 151 stored in the product information DB 150 and performs matching to thereby recognize the product. Further, the product recognition unit 118 stores the relationship between placement positions on a shelf and products into the product information DB 150, and identifies the product based on the product picked up by the customer or the position of the shelf on which the product looked at by the customer is placed.

A sales promotion method (sales promotion process) that is performed in the sales promotion system (sales promotion device) according to this exemplary embodiment is described hereinafter with reference to FIG. 5.

Figure 5:
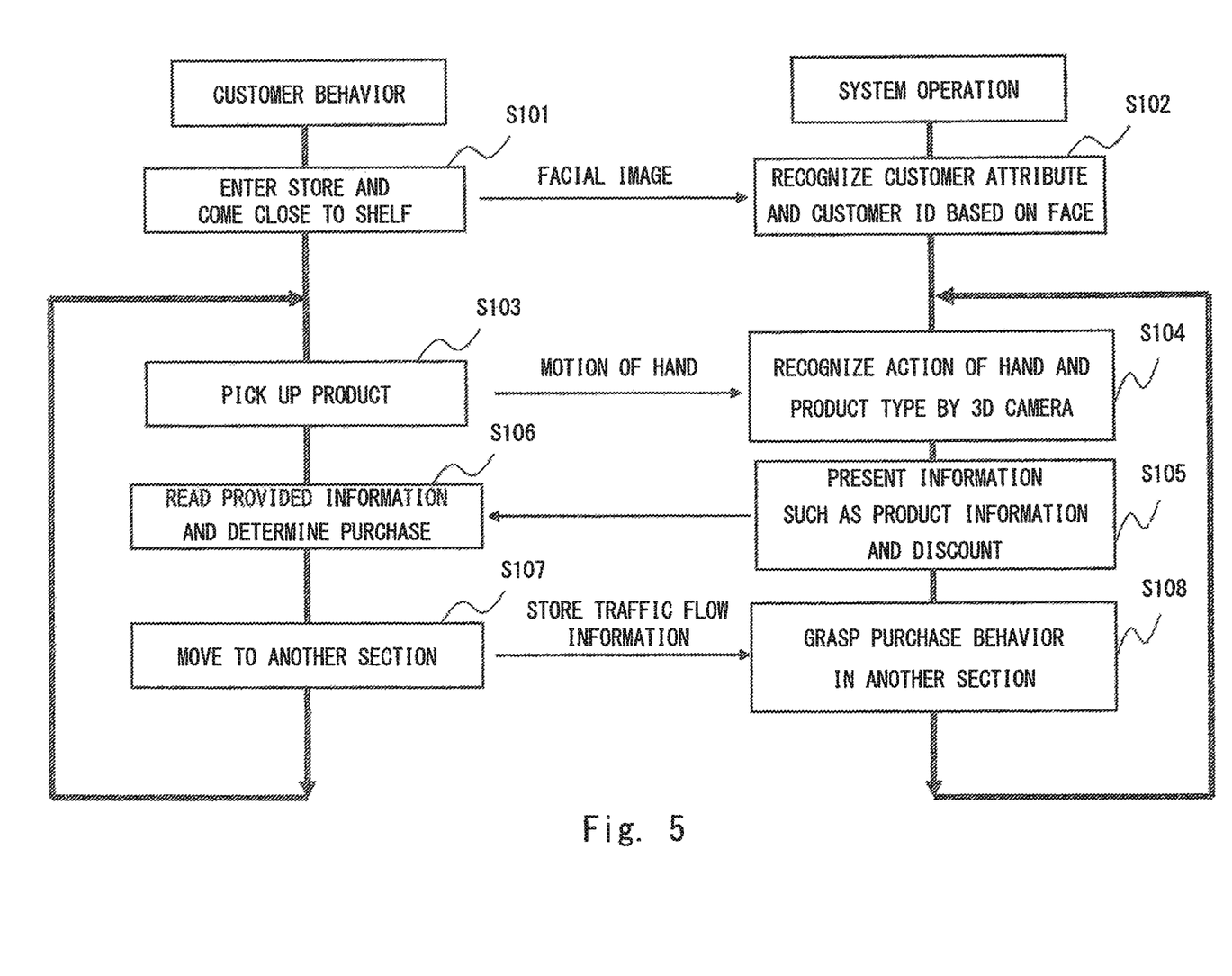
FIG. 5 is a flowchart showing the operation of the sales promotion system according to the first exemplary embodiment.

As shown in FIG. 5, a customer enters a store and comes close to a shelf in the store (S101). Then, the facial recognition camera 220 in the store generates a facial image of the customer, and the sales promotion device 100 recognizes a customer attribute and a customer ID based on the facial image (S102). Specifically, the customer recognition unit 120 in the sales promotion device 100 compares facial image information of the customer identification information 161 stored in the customer information DB 160 with the facial image taken by the facial recognition camera 220 and retrieves information on a customer who matches and thereby recognizes the customer, and then acquires the customer attribute and the customer ID of the recognized customer from the customer identification information 161.

After that, the customer picks up a product placed on the shelf (S103). Then, the 3D camera 210 in the vicinity of the shelf takes an image of the customer's hand, and the sales promotion device 100 recognizes the action of the customer's hand and a product type by using the distance image of the 3D camera 210 (S104). Specifically, the distance image analysis unit 110 in the sales promotion device 100 tracks the distance image of an image of the customer's hand (line of sight) and the product, and detects the action that the customer has picked up the product (the customer looks at the product) and detects the product that matches the product picked up by the customer by referring to the product information DB 150, and thereby recognizes the product picked up by the customer (the product looked at by the customer).

Then, the sales promotion device 100 presents the promotion information (relevant information) such as product information or discount of the product recognized in S104 to the information presentation device 240 (S105). The customer then reads the presented information (provided information) presented on the information presentation device 240 and thereby determines whether to purchase the product he/she has picked up (or looked at) (S106). Specifically, the presentation information generation unit 140 in the sales promotion device 100 presents the promotion information related to the recognized product by referring to the product information DB 150 and the customer information DB 160. Further, the presentation information generation unit 140 presents, as the promotion information, information about the product related to the customer recognized in S102 and further presents information about the product related to the customer traffic flow analyzed in S108, which is described later.

After that, the customer moves to another section (S107). Then, the in-store camera 230 takes an image of the customer's movement between sections, and the sales promotion device 100 grasps the purchase behavior in another section (S108). Specifically, the flow analysis unit 130 in the sales promotion device 100 analyzes the customer's moving history based on the images of a plurality of sections and detects the customer traffic flow and thereby grasps the purchase behavior of the customer. Then, the processing after S103 is repeated, and when the customer picks up a product in a section to which he/she has moved, information related to the product on the basis of the customer traffic flow (purchase behavior) is presented to the customer.

Figure 6:
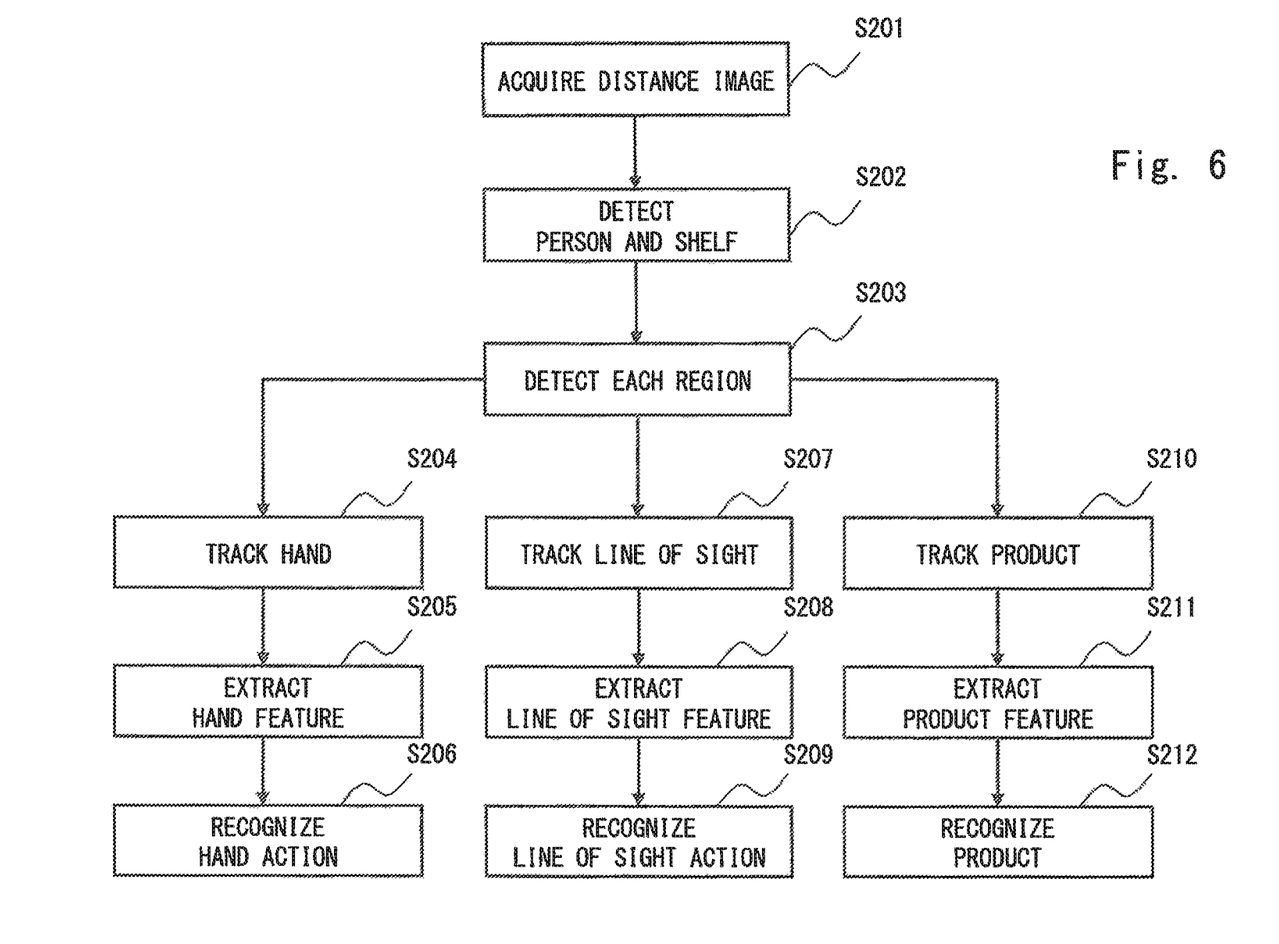
FIG. 6 is a flowchart showing the operation of a distance image analysis process according to the first exemplary embodiment.

FIG. 6 shows the details of a recognition processing (tracking processing) performed by the distance image analysis unit 110 in S104 of FIG. 5. Note that the image analysis processing shown in FIG. 6 is one example thereof, and the action of a hand, the action of the line of sight, and a product may be recognized by another image analysis processing.

As shown in FIG. 6, the distance image acquisition unit 111 first acquires a distance image containing a customer and a product from the 3D camera 210 (S201). Next, the region detection unit 112 detects a person and a shelf contained in the distance image acquired in S201 (S202) and further detects each region of the person and the shelf (S203). For example, the region detection unit 112 detects a person (customer) based on the image and the distance contained in the distance image by using a discrimination circuit such as SVM (Support Vector Machine), and estimates the joint of the detected person and thereby detects the bone structure of the person. The region detection unit 112 detects the region of each part such as the person's hand or face (eye) based on the detected bone structure. Further, the region detection unit 112 detects the shelf and each plate of the shelf and further detects the product placement area on each shelf based on the image and the distance contained in the distance image by using the discrimination circuit.

Then, the hand tracking unit 113 tracks the action of the customer's hand detected in S203 (S204). The hand tracking unit 113 tracks the bone structure of the customer's hand and its vicinity and detects the action of the finger or palm of the hand based on the image and the distance contained in the distance image.

After that, the hand action recognition unit 114 extracts the feature of the action of the hand based on the action of the hand tracked in S204 (S205), and recognizes the action of the customer's hand on the product, which is the action of holding the product or the action of looking at the product, based on the extracted feature (S206). The hand action recognition unit 114 extracts the direction, angle, and change in movement of the finger or the palm (wrist) as a feature amount. For example, the hand action recognition unit 114 detects that the customer is holding the product from the angle of the finger, and when the direction of the normal to the palm is toward the face, it detects that the customer is looking at the product. Further, the state of holding a product or the state of picking up and looking at a product may be learned in advance, and the action of the hand may be identified by comparison with the learned feature amount.

After S203, the sight line tracking unit 115 tracks the action of the customer's line of sight detected in S203 (S207). The sight line tracking unit 115 tracks the bone structure of the customer's face and its vicinity and detects the action of the face, eye and pupil based on the image and the distance contained in the distance image.

After that, the sight line action recognition unit 116 extracts the feature of the action of the line of sight based on the action of the line of sight tracked in S207 (S208), and recognizes the action of the customer's line of sight on the product, which is the action that the customer is looking at the product, based on the extracted feature (S209). The sight line action recognition unit 116 extracts the direction, angle, and change in movement of the face, eye and pupil as a feature amount. For example, the sight line action recognition unit 116 detects the direction of the light of sight based on the action of the face, eye and pupil and detects whether the direction of the line of sight is toward the product or not. Further, the state of looking at a product may be learned in advance, the action of the line of sight may be identified by comparison with the learned feature amount.

After S203, the product tracking unit 117 tracks the action (state) of the product detected in S203 (S210). Further, the product tracking unit 117 tracks the product determined that the customer picks up in S206 and the product determined that the customer looks at in S209. The product tracking unit 117 detects the orientation, position and the like of the product based on the image and the distance contained in the distance image.

Then, the product recognition unit 118 extracts the feature of the product tracked in S210 (S211) and, based on the extracted feature, recognizes the corresponding product from the product information DB 150 (S212). The product recognition unit 118 extracts the letters or image of the label on the product as a feature amount. For example, the product recognition unit 118 compares the extracted feature amount of the label with the feature amount of the label in the product information DB 150 and retrieves the product where the feature amount matches and thereby identifies the product. Further, in the case where the relationship between placement positions on the shelf and products is stored in the product information DB 150, the position on the shelf of the product which the customer picks up or looked at is acquired, and the position of the shelf is retrieved from the product information DB 150 to thereby detect the matching product.

Figure 7:
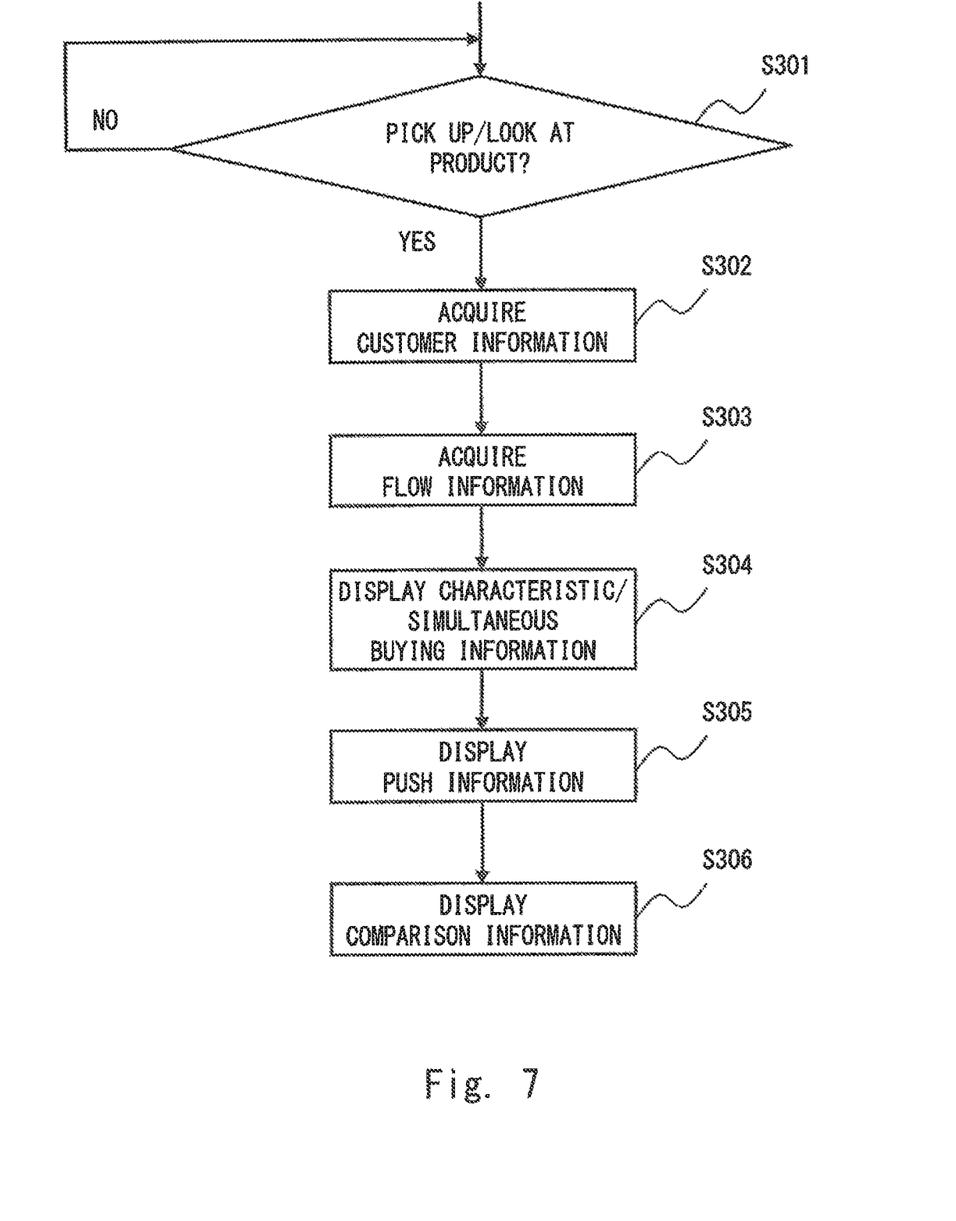
FIG. 7 is a flowchart showing the operation of an information presentation process according to the first exemplary embodiment.

FIG. 7 shows the details of the information presentation processing performed in S104 and S105 of FIG. 5.

As shown in FIG. 7, the distance image analysis unit 110 determines whether a customer picks up and looks at a product or a customer looks at a product (S301). For example, it determines the action such as the palm facing the face, picking up and looking at a box, bottle or the like, keeping looking for a certain period, or picking up and looking at two products in both hands. When the customer performs the corresponding action, the following processing is performed to display the promotion information in accordance with the action.

Specifically, the presentation information generation unit 140 acquires customer information (S302) and acquires flow information (S303). The presentation information generation unit 140 acquires the customer information from the customer recognition unit 120 so as to provide information on the basis of a customer recognition result by the facial image of the facial recognition camera 220 to the customer.

Further, the presentation information generation unit 140 acquires the flow information from the flow analysis unit 130 so as to provide information on the basis of a customer traffic flow analysis result by the in-store image of the in-store camera 230 to the customer. Note that, before recognizing a customer, before a customer moves, and when each information is not necessary, the acquisition of customer information and the acquisition of flow information may be omitted.

Then, the presentation information generation unit 140 generates the promotion information (product related information) and presents it to the customer in S304 to S306. Note that S304 to S306 show one example of information to be presented, and other promotion information may be presented. The presentation of S304 to S306 may be done at the same time or in an arbitrary order. Further, information that is arbitrary selected among S304 to S306 may be presented or may be presented together with other information.

In S304, the presentation information generation unit 140 refers to the product information DB 150 and acquires the characteristic/simultaneous buying information 152 related to the target product which the customer picks up/looks at, generates the acquired characteristic/simultaneous buying information 152 as the presentation information and outputs it to the information presentation device 240.

For example, the presentation information generation unit 140 generates information such as area of production or raw material of a product which a customer picks up, food to be eaten in combination with a product which a customer picks up (cheese that is good with wine when wine is picked up), food from similar area of production or raw material, a recipe that uses the product as ingredients (pizza when cheese is picked up), ingredients and cookware included in this recipe (pizza crust or topping, oven range etc.), coordinated products (clothes, shoes, belt, bag etc.) and the like. Further, for the related product, information that instructs a route or guides the way of shopping in the store.

Further, among the characteristic/simultaneous buying information 152, adapted information such as information narrowed down by the customer information acquired in S302 or information narrowed down by the flow information acquired in S303 is used as the presentation information. For example, the provided information is adapted by the recognized customer attribute such as a gender and an age or the member customer ID, and the provided information is adapted by findings of the purchase or interests in another section by the customer traffic flow analysis. For example, information related to diet, allergy information and health may be presented based on the attributes, preferences, history and the like. When a plurality of digital signage are placed in a store, for example, the promotion information may be presented in the plurality of digital signage in conjunction along the recognized customer traffic flow.

In S305, the presentation information generation unit 140 refers to the product information DB 150 and acquires the push information 153 related to the target product which the customer picks up/looks at, generates the acquired push information 153 as the presentation information and outputs it to the information presentation device 240. Particularly, when a customer keeps looking at a product for a specified period of time, it is assumed that the customer is thinking about whether to purchase the product, and it is preferred to present the push information (encouraging information).

For example, the presentation information generation unit 140 generates a discount proposal such as "50% discount for the second item", a discount coupon, word-of-mouth information, ranking information and the like for the product which the customer picks up. Information of a discount coupon may be displayed, and the coupon may be made available by cooperation with a smartphone. A barcode of a product may be read through a reader device of a shopping cart or the like, and the current subtotal is displayed, and further the amount after the discount may be displayed.

Further, as in S304, among the push information 153, adapted information such as information narrowed down by the customer information acquired in S302 or information narrowed down by the flow information acquired in S303 is used as the presentation information.

In S306, the presentation information generation unit 140 refers to the product information DB 150 and acquires the comparison information 154 related to the target product which the customer picks up/looks at, generates the acquired comparison information 154 as the presentation information and outputs it to the information presentation device 240.

For example, when the customer picks up two products, the presentation information generation unit 140 generates information that compares the characteristics, functions, price, discount and ranking of those two products. In the case where there is a product whose purchase is to be recommended among those two products, the push information such as discount information is presented in the same manner as in S305. When it is detected that the customer is looking at the display of a best-before date on a product label, discount information of the older one (the one with an earlier best-before date) may be displayed.

Further, as in S304, among the comparison information 154, adapted information such as information narrowed down by the customer information acquired in S302 or information narrowed down by the flow information acquired in S303 is used as the presentation information.

As described above, in this exemplary embodiment, the customer's hand motion is observed by the 3D camera placed at the portion from which a product shelf and a client (shopper) in front of the shelf can view to recognize which product the customer picks up. Then, on an information presentation device (display device) adjacent to the product, the promotion information such as information about the product, a discount proposal or related recommendation information is displayed.

Because it is possible to precisely grasp the hand motion by the 3D camera and thereby grasp the action on a product such as touching the product, picking up the product or rotating the product to read the label, the promotion information adapted to the motion can be displayed timely (real time). Specifically, because it is possible to accurately detect that the customer becomes interested in the product based on such an action, the promotion can be carried out effectively for the customer who becomes interested in the product, thereby promoting the purchase of the product and increasing the sales.

For example, when it is detected that a customer has two products in both hands and compares them, comparison information of the both products, presentation of a coupon for the product desired to be sold or the like may be displayed to thereby encourage (push) the customer who is thinking about whether to purchase the product to determine the purchase of the product.

Further, by adapting the promotion information with the customer information recognized using the facial recognition camera or adapting the promotion information with the customer traffic flow analyzed using the in-store camera, it is possible to present more effective information.

Second Exemplary Embodiment

Figure 8:
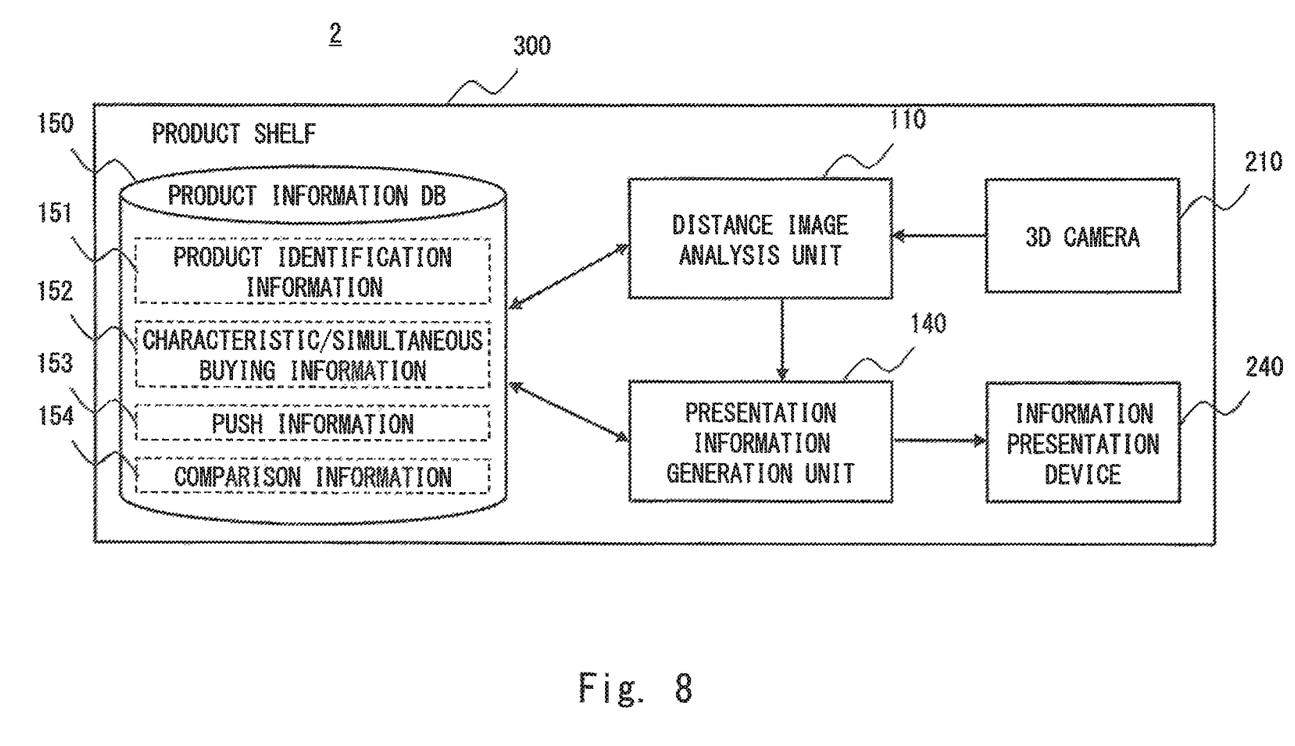
FIG. 8 is a block diagram showing the configuration of a shelf system according to a second exemplary embodiment.

A second exemplary embodiment is described hereinafter with reference to the drawings. In this exemplary embodiment, an example where the first exemplary embodiment is applied to one shelf system is described. FIG. 8 shows the configuration of a shelf system according to this exemplary embodiment.

As shown in FIG. 8, a shelf system 2 according to this exemplary embodiment includes a product shelf 300. The product shelf 300 is a shelf where a product 301 is placed as in FIGS. 3A and 3B. In this exemplary embodiment, the product shelf 300 includes the 3D camera 210, the information presentation device (information presentation unit) 240, the distance image analysis unit 110, the presentation information generation unit 140, and the product information DB 150, which are described in the first exemplary embodiment. Note that the facial recognition camera 220, the customer recognition unit 120 and the customer information DB 160 may be further included according to need.

The presentation information generation unit 140 generates promotion information to be presented to a customer based on a detection result of the distance image analysis unit 110, and outputs the generated promotion information to the information presentation device 240. The presentation information generation unit 140 refers to the product information DB 150 and generates, as the promotion information, information related to the product which the distance image analysis unit 110 detects that a customer has touched.

Figure 9:
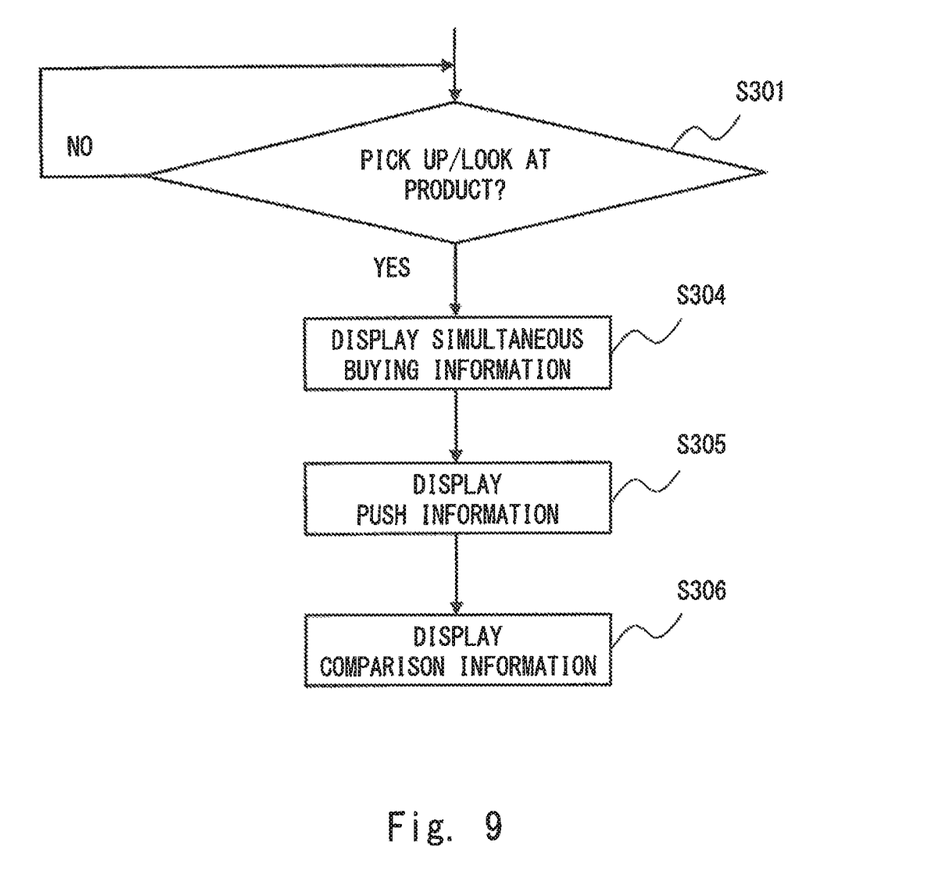
FIG. 9 is a flowchart showing the operation of the shelf system according to the second exemplary embodiment.

FIG. 9 shows the operation of the shelf system 2 according to this exemplary embodiment. As shown in FIG. 9, like in the first exemplary embodiment, the distance image analysis unit 110 determines whether a customer picks up and looks at a product or a customer looks at a product (S301).

When the customer performs the corresponding action, the presentation information generation unit 140 generates promotion information (product related information) in S304 to S306 and presents it to the customer. Although the generation of information on the basis of customer information and flow information is not done in this exemplary embodiment, which is different from the first exemplary embodiment, the other operation is the same as that in the first exemplary embodiment.

Specifically, the presentation information generation unit 140 acquires the characteristic/simultaneous buying information 152 related to the target product which the customer picks up/looks at, generates the presentation information such as food to be eaten in combination and outputs it to the information presentation device 240 (S304). Further, the presentation information generation unit 140 acquires the push information 153 related to the target product which the customer picks up/looks at, generates the presentation information such as a discount coupon and outputs it to the information presentation device 240 (S305). Further, the presentation information generation unit 140 acquires the comparison information 154 related to the target product which the customer picks up/looks at, generates the presentation information such as information about the comparison in characteristics and the like between two products held in both hands and outputs it to the information presentation device 240 (S306).

As described above, in this exemplary embodiment, the main elements in the first exemplary embodiment are included in one product shelf. It is thereby possible to accurately detect a customer's action on a product and display the promotion information in accordance with the customer's action in a timely manner.

Further, because this exemplary embodiment can be implemented with one product shelf only, a device or a system other than the shelf is not required. It is thus possible to easily introduce this system even in a store where there is no advanced system such as a POS system or a network.

It should be noted that the present invention is not limited to the above-described exemplary embodiment and may be varied in many ways within the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-185129, filed on Sep. 6, 2013, the disclosure of which is incorporated herein in its entirety by reference.

REFERENCE SIGNS LIST

1 SALES PROMOTION SYSTEM
2 SHELF SYSTEM
10 SALES PROMOTION SYSTEM
11 IMAGE INFORMATION ACQUISITION UNIT
12 TRACKING UNIT
13 PROMOTION INFORMATION OUTPUT UNIT
100 SALES PROMOTION DEVICE
110 DISTANCE IMAGE ANALYSIS UNIT
111 DISTANCE IMAGE ACQUISITION UNIT
112 REGION DETECTION UNIT
113 HAND TRACKING UNIT
114 HAND ACTION RECOGNITION UNIT
115 SIGHT LINE TRACKING UNIT
116 SIGHT LINE ACTION RECOGNITION UNIT
117 PRODUCT TRACKING UNIT
118 PRODUCT RECOGNITION UNIT
120 CUSTOMER RECOGNITION UNIT
130 FLOW ANALYSIS UNIT
140 PRESENTATION INFORMATION GENERATION UNIT
150 PRODUCT INFORMATION DB
151 PRODUCT IDENTIFICATION INFORMATION
152 CHARACTERISTIC/SIMULTANEOUS BUYING INFORMATION
153 PUSH INFORMATION
154 COMPARISON INFORMATION
160 CUSTOMER INFORMATION DB
161 CUSTOMER IDENTIFICATION INFORMATION
162 ATTRIBUTE INFORMATION
163 PREFERENCE INFORMATION
164 HISTORY INFORMATION
210 3D CAMERA
220 FACIAL RECOGNITION CAMERA
230 IN-STORE CAMERA
240 INFORMATION PRESENTATION DEVICE
300 PRODUCT SHELF
301 PRODUCT
400 CUSTOMER

The invention claimed is:

1. A sales promotion system, comprising:
a memory storing instructions; and
one or more processors coupled to the memory, wherein the one or more processors are configured to execute the instructions to:
acquire an information of a customer;
track a palm of a hand of the customer regarding a product based on an input image information;
when the palm of the hand of the customer is facing a face of the customer, recognize an action of the customer indicating that the customer has picked up and looked at the product;
based on the action of the customer, detect a moving route of the customer via a plurality of sections and a purchasing behavior on the moving route; and
based on the information of the customer, the moving route, and the purchasing behavior, output to the customer sales promotion information for recommending the customer purchase another product different from the product.

2. The sales promotion system according to claim 1, wherein the one or more processors are configured to execute the instructions to output the sales promotion information to the customer, in case it is recognized that the customer has picked up the product in a section to which the customer has moved.

3. The sales promotion system according to claim 1, wherein the sales promotion information is information narrowed down by information corresponding to the customer traffic flow among simultaneous buying information for suggesting to the customer simultaneous buying of the another product with the product to the customer.

4. The sales promotion system according to claim 1, wherein the product is a product that the customer picked up and looked at, and when the customer keeps looking at the product for a specified period of time, the one or more processors are configured to execute the instructions to output push information for encouraging the purchase of the product.

5. The sales promotion system according to claim 1, wherein when a plurality of signage are placed in a facility, the one or more processors are configured to execute the instructions to output the sales promotion information to a position along the moving route of the customer or the plurality of signage.

6. A sales promotion method comprising:
acquiring an information of a customer
tracking a palm of a hand of the customer regarding a product based on an input image information;
when the palm of the hand of the customer is facing a face of the customer, recognizing an action of the customer indicating that the customer has picked up and looked at the product;
based on the action of the customer, detecting a moving route of the customer via a plurality of sections and a purchasing behavior on the moving route; and
based on the information of the customer, the moving route, and the purchasing behavior, outputting to the customer sales promotion information for recommending the customer purchase another product different from the product.

7. The sales promotion method according to claim 6, comprising outputting the sales promotion information to the customer, in case it is recognized that the customer has picked up the product in a section to which the customer has moved.

8. The sales promotion system according to claim 6, wherein the sales promotion information is information narrowed down by information corresponding to the customer traffic flow among simultaneous buying information for suggesting to the customer simultaneous buying of the another product with the product to the customer.

9. A non-transitory computer readable medium storing a sales promotion program, when executed by a processor, causes the processor to perform a sales promotion method comprising:
acquiring an information of a customer;
tracking a palm of a hand an action of the customer regarding a product based on an input image information;
when the palm of the hand of the customer is facing a face of the customer, recognizing an action of the customer indicating that the customer has picked up and looked at the product;
based on the action of the customer, detecting a moving route of the customer via a plurality of sections and a purchasing behavior on the moving route; and
based on the information of the customer, the moving route, and the purchasing behavior, outputting to the customer sales promotion information for recommending the customer purchase another product different from the product.

10. The non-transitory computer readable medium according to claim 9, the sales promotion method comprising outputting the sales promotion information to the customer, in case it is recognized that the customer has picked up the product in a section to which the customer has moved.

11. The non-transitory computer readable medium according to claim 9, wherein the sales promotion information is information narrowed down by information corresponding to the customer traffic flow among simultaneous buying information for suggesting to the customer simultaneous buying of the another product with the product to the customer.

* * * * *